UNITED STATES PATENT OFFICE.

ROLAND L. ANDREAU, OF WILMINGTON, DELAWARE, ASSIGNOR TO E. I. DU PONT DE NEMOURS AND COMPANY, OF WILMINGTON, DELAWARE, A CORPORATION OF DELAWARE.

METHOD OF PRODUCING SYNTHETIC CAMPHOR.

1,313,661.  Specification of Letters Patent.  Patented Aug. 19, 1919.

No Drawing.  Application filed May 31, 1917. Serial No. 172,084.

*To all whom it may concern:*

Be it known that I, ROLAND L. ANDREAU, of Wilmington, in the county of New Castle and in the State of Delaware, have invented a certain new and useful Improvement in Methods of Producing Synthetic Camphor, and do hereby declare that the following is a full, clear, and exact description thereof.

My invention relates particularly to the production of camphor synthetically but it relates especially to the production of the same from isoborneol.

Hitherto it has been believed that in order to change isoborneol into camphor by the oxidation of the former with nitric acid it was necessary for some of the lower oxids of nitrogen to be initially present, and it was therefore believed that pure nitric acid could not be used advantageously for the conversion of isoborneol into camphor.

The object of my invention is to produce camphor synthetically from isoborneol by the oxidation of the latter without depending upon the presence of such lower oxids of nitrogen.

A further object is to produce camphor from isoborneol by oxidation with nitric acid through the accelerating action of a halogen such as bromin, an oxygenated halogen compound such as nitrosyl chlorid, an oxygenated halogen acid such as iodic acid or perchloric acid, a halogen salt containing a large amount of halogen such as ferric chlorid or an oxygenated salt such as potassium chlorate or potassium perchlorate. The above classes of substances of which nitrosyl chlorid, iodic acid, potassium chlorate, and ferric chlorid are species, may be referred to generically as halogen compounds of a high degree of oxidation.

While my invention is capable of being carried on in many different ways, for the purpose of illustration I shall describe only certain modes of procedure by means of which my invention may be carried out.

For example I may heat 1 kilogram of pure nitric acid of a specific gravity of 1.40 to 40° C. and then add 10 grams of ferric chlorid, bromin, perchloric acid or potassium chlorate, which may be brought into solution by agitation of the liquid. The solution thus formed does not contain any nitrous acid nor any of the lower oxids of nitrogen. I then add isoborneol slowly in quantities of from 5 to 10 grams. The oxidation starts spontaneously and the temperature rises a few degrees. Thereupon the liquid is allowed to cool a few degrees and more isoborneol is gradually added and the entire mass is stirred until the isoborneol is completely transformed into camphor. In this way 250 grams of isoborneol may be added and changed into camphor. If desired during the reaction additional pure or commercial nitric acid may be added and more isoborneol may be introduced until the total quantity of camphor desired is obtained. As the isoborneol is oxidized the solid particles disappear. The reaction is complete when the mixture no longer contains any solid isoborneol. When the reaction is complete the supernatant liquid is decanted and allowed to run slowly into water with constant stirring, whereupon the camphor separates as a flocculent precipitate which is drained, washed and dried.

While I have described my invention above in detail, I wish it to be understood that many changes may be made therein without departing from the spirit of the same as, for example, the temperatures and the quantities of the materials may vary to a considerable extent. By the term halogen used herein I mean to refer to the same uncombined or when present in compounds.

I claim:

1. The process which comprises producing camphor from isoborneol by a treatment thereof with nitric acid in the initial absence of lower oxids of nitrogen and in the presence of a substance comprising a halogen.

2. The process which comprises producing camphor from isoborneol by starting the oxidation thereof in the absence of lower oxids of nitrogen and in the presence of ferric chlorid.

3. The process which comprises producing camphor from isoborneol by a treatment thereof with nitric acid in the initial absence of lower oxids of nitrogen and in the presence of ferric chlorid.

4. The process which comprises producing camphor from isoborneol by a treatment thereof with nitric acid in the presence of a substance comprising a halogen.

5. The process which comprises producing camphor from isoborneol by treatment thereof with nitric acid in the presence of a halogen compound of a high degree of oxidation.

6. The process which comprises producing camphor from isoborneol by a treatment thereof with nitric acid in the presence of ferric chlorid.

7. The process which comprises producing camphor from isoborneol by applying thereto nitric acid at a temperature not above 40° C.

8. The process which comprises producing camphor from isoborneol by applying thereto nitric acid at a temperature not above 40° C. in the presence of a halogen compound of a high degree of oxidation.

9. The process which comprises producing camphor from isoborneol by applying thereto nitric acid at a temperature not above 40° C. in the presence of ferric chlorid.

10. The process which comprises producing camphor from isoborneol by treatment thereof with nitric acid in the initial absence of lower oxids of nitrogen and in the presence of a halogen compound of a high degree of oxidation.

11. The process which comprises producing camphor from isoborneol by treatment thereof with nitric acid in the initial absence of lower oxids of nitrogen and in the presence of a halogen salt of a high degree of oxidation.

In testimony that I claim the foregoing I have hereunto set my hand.

ROLAND L. ANDREAU.

Witnesses:
  G. D. HOPKINS,
  C. G. BURKE.